United States Patent
Ozaki

(10) Patent No.: US 7,494,618 B2
(45) Date of Patent: Feb. 24, 2009

(54) ALLOY TOOL STEEL

(75) Inventor: Kozo Ozaki, Nagoya (JP)

(73) Assignee: Daido Tokushuko Kabushiki Kaisha, Nagoya-shi (JP)

( * ) Notice: Subject to any disclaimer, the term of this patent is extended or adjusted under 35 U.S.C. 154(b) by 465 days.

(21) Appl. No.: 11/004,862

(22) Filed: Dec. 7, 2004

(65) Prior Publication Data
US 2005/0161125 A1    Jul. 28, 2005

(30) Foreign Application Priority Data
Jan. 26, 2004    (JP) .............................. 2004-016757

(51) Int. Cl.
C22C 38/24    (2006.01)
C22C 38/22    (2006.01)
C22C 38/44    (2006.01)
C22C 38/46    (2006.01)

(52) U.S. Cl. ........................ 420/109; 420/112; 420/113; 420/114

(58) Field of Classification Search ......... 420/109–114; 148/334, 335
See application file for complete search history.

(56) References Cited
FOREIGN PATENT DOCUMENTS

| JP | 57-143468 | * | 9/1982 |
|---|---|---|---|
| JP | 2-8347 | | 1/1990 |
| JP | 2-11736 | | 1/1990 |
| JP | 2-43346 | * | 2/1990 |
| JP | 2-125840 | * | 5/1990 |
| JP | 02-298234 | | 12/1990 |
| JP | 4-354852 | * | 10/1991 |
| JP | 3-236445 | * | 12/1992 |
| JP | 06-088166 | | 3/1994 |
| JP | 06-145884 | | 5/1994 |
| JP | 7-207414 | | 8/1995 |
| JP | 10-121195 | * | 5/1998 |
| JP | 2003-268499 | | 9/2003 |
| JP | 2003-226939 | * | 10/2003 |

* cited by examiner

*Primary Examiner*—Deborah Yee
(74) *Attorney, Agent, or Firm*—Oblon, Spivak, McClelland, Maier & Neustadt, P.C.

(57) ABSTRACT

To provide an alloy tool steel having high-temperature strength at an operating temperature of the order of 700° C., while maintaining room-temperature strength as high as that of a conventional matrix high-speed tool steel. The steel contains from 0.45 wt % to 0.65 wt % C, from 0.10 wt % to 1.00 wt % Si, from 0.20 wt % to 2.00 wt % Mn, not more than 0.020 wt % P, not more than 0.015 wt % S, not more than 1.00 wt % Cu, not more than 1.00 wt % Ni, from 3.50 wt % to 5.00 wt % Cr, from 0.00 wt % to 3.00 wt % Mo, from 0.00 wt % to 10.00 wt % W, from 1.00 wt % to 2.00 wt % V, from 0.00 wt % to 8.00 wt % Co, not more than 0.10 wt % Al, not more than 0.01 wt % O, not more than 0.02 wt % N, and the balance substantially constituted of Fe and unavoidable impurities, in which Weq is from 2.0 to 10.0, 2Mo/Weq is not more than 0.60, and ΔC is from −0.3 to 0.0.

8 Claims, 1 Drawing Sheet

ALLOY TOOL STEEL

BACKGROUND OF THE INVENTION

1. Field of the Invention

The present invention relates to an alloy tool steel, more specifically relates to an alloy tool steel which is applied to various tools including hot plastic working dies and warm plastic working dies.

2. Description of Related Art

Conventionally, for hot/warm plastic working dies used under severe conditions (i.e., at high bearing pressures and high temperatures), W—Cr series hot die steels such as JIS-SKD8, which places importance on softening resistance, and forging die steels such as JIS-SKT4 are applied.

In addition, in some fields of hot/warm working, a matrix high-speed tool steel is also used since high strength can be secured both at room temperatures and high temperatures. For example, Japanese Patent Application Unexamined Publications Nos. Hei2-8347 and Hei2-11736 disclose a hot working tool steel containing from 0.98 wt % to 1.61 wt % W and from 1.98 wt % to 2.55 wt % Mo in addition to elements such as C, Si, Mn, Cr, V and Co (see column 8, lines 1 to 14 and Table 1 in both the references). In these references, it is described that when one or both of W and Mo constitute from 2.0 wt % to 3.50 wt % in terms of 1/2W+Mo, softening resistance and high-temperature strength may be improved without deteriorating toughness.

Further, Japanese Patent Application Unexamined Publication No. Hei7-207414 discloses a steel for aluminum casting molds containing from 0.42 wt % to 3.21 wt % W and from 0.35 wt % to 3.70 wt % Mo in addition to the elements such as C, Si, Mn, Cr, V and Co (see paragraph 0014 and Table 1). In this reference, it is described that when one or both of W and Mo constitute from 0.2 wt % to 4.0 wt % in terms of 1/2W+Mo, deterioration in toughness may be prevented.

Furthermore, Japanese Patent Application Unexamined Publication No. 2003-268499 discloses, instead of the matrix high-speed tool steel, a high-speed tool steel in which from 2.0 wt % to 9.5 wt % Mo and from 1.0 wt % to 16.0 wt % W are contained in addition to the elements such as C, Si, Mn, Cr, V and Co, and 2Mo+W constitutes from 5 wt % to 20 wt % (see paragraph 0034). In this reference, it is described that when 2Mo/(2Mo+W) constitutes not more than 0.9, softening resistance at high temperatures may be improved and hardness against heat treatment may be secured during low temperature hardening.

JIS-SKD61 which is most widely used as the hot die steel contains Mo instead of W, so that it has improved toughness and is stable toward thermal shock. However, as SKD61 has the maximum hardness on the order of 50 HRC and softening resistance is insufficient, it cannot be applied to hot/warm plastic working dies used under severe conditions.

On the other hand, among JIS steels, the W—Cr series hot die steel (for example, SKD8) shows high strength and high softening resistance. However, even the W—Cr series hot die steel has the maximum hardness on the order of 55 HRC, and it is difficult to apply to dies for press forging used under severe conditions. In addition, the forging die steel (for example, SKT4) has problems that (1) application to a large product is difficult due to its insufficient hardenability, and (2) the maximum hardness is on the order of 55 HRC, thus high strength is not secured.

To the contrary, in the matrix high-speed tool steel, high strength may be secured and it is superior to the conventional hot die steel and forging die steel. However, as the conventional matrix high-speed tool steel is still insufficient in strength at 700° C., there is a problem that sufficient durability cannot be attained when it is applied in hot/warm plastic working during which an outermost layer reaches the order of 700° C.

SUMMARY OF THE INVENTION

An object of the invention is to overcome the problems described above and to provide an alloy tool steel while securing high-temperature strength at the order of 700° C, which is an operating temperature thereof, and maintaining room-temperature strength as high as that of a conventional matrix high-speed tool steel. Another object of the invention is to improve lifetime of hot/warm plastic working dies by providing a material which suppresses lowering of strength at an outermost layer while maintaining room-temperature strength for backing up the dies.

To achieve the objects and in accordance with the purpose of the present invention, an alloy tool steel consistent with the preferred embodiment of the present invention contains from 0.45 wt % to 0.65 wt % C, from 0.10 wt % to 1.00 wt % Si, from 0.20 wt % to 2.00 wt % Mn, not more than 0.020 wt % P, not more than 0.015 wt % S, not more than 1.00 wt % Cu, not more than 1.00 wt % Ni, from 3.50 wt % to 5.00 wt % Cr, from 0.00 wt % to 3.00 wt % Mo, from 0.00 wt % to 10.00 wt % W, from 1.00 wt % to 2.00 wt % V, from 0.00 wt % to 8.00 wt % Co, not more than 0.10 wt % Al, not more than 0.01 wt % O, not more than 0.02 wt % N, and the balance substantially constituted of Fe and unavoidable impurities, in which Weq is from 2.0 to 10.0, 2Mo/Weq is not more than 0.60, and ΔC is from −0.3 to 0.0, where Weq=2Mo(wt %)+W(wt %), and ΔC=C(wt %)−(0.06×Cr(wt %)+0.063×Mo (wt %)+0.033×W(wt %)+0.2×V(wt %)).

Since the alloy tool steel consistent with the preferred embodiment of the present invention is made as an extension of a matrix high-speed tool steel, and a ratio of Mo to W (2Mo/Weq) is optimized, lowering of strength at high temperatures (high-temperature strength) may be suppressed while maintaining strength at room temperatures (room-temperature strength). Further, as a ΔC amount is optimized as well, both high hardness and high toughness may be attained.

Additional objects and advantages of the invention are set forth in the description which follows, are obvious from the description, or may be learned by practicing the invention. The objects and advantages of the invention may be realized and attained by the alloy tool steel in the claims.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings.

DETAILED DESCRIPTION OF THE PREFERRED EMBODIMENTS

Figure 1:
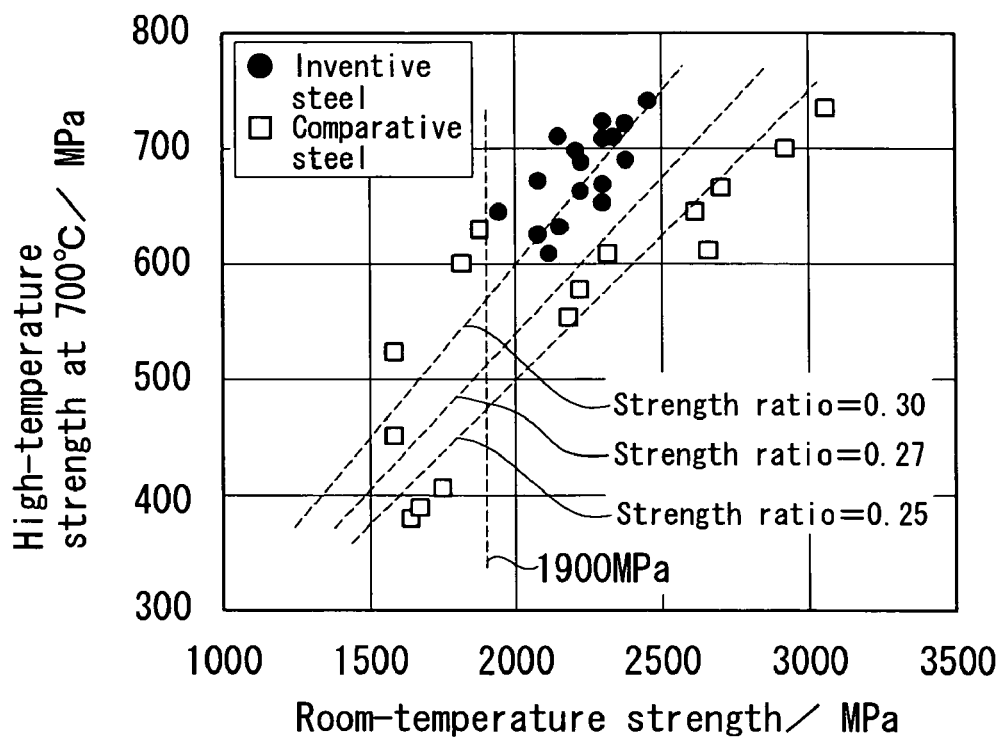
FIG. 1 is a graph showing a relationship between room-temperature strength and high-temperature strength at 700° C. in respect of inventive steels and comparative steels.

A detailed description of one preferred embodiment of an alloy tool steel embodied by the present invention is provided below. The alloy tool steel consistent with the present invention is characterized as containing elements as provided below, and the balance thereof substantially consisting of Fe and unavoidable impurities. Hereinafter, description will be given on the addition elements, ranges of an addition amount thereof, and reasons for limitation of the ranges.

(1) C: from 0.45 wt % to 0.65 wt %

C is an element which is necessary for securing hardness and wear resistance. In order to secure the maximum hardness after hardening and tempering of not less than 60 HRC, an addition amount of C is required to keep not less than 0.45 wt %. On the other hand, when C is added in a large amount, it combines with carbide-forming elements (Cr, Mo, W and V) to form carbide. Thus a large amount of carbide remains at the time of hardening, which leads to lowering of toughness. Therefore, the addition amount of C is preferably not more than 0.65 wt %. In order to secure softening resistance and the toughness while securing the hardness, the addition amount of C is more preferably from 0.50 wt % to 0.60 wt %.

(2) Si: from 0.10 wt % to 1.00 wt %

Si is added as a deoxidation element and dissolves in both the carbide and the matrix whereby contributing to improved hardness. Thus, an addition amount of Si is 0.10 wt % at minimum. On the other hand, when Si is excessively added, hot workability and toughness are lowered. Therefore, the addition amount of Si is preferably not more than 1.00 wt %. In order to suppress the lowering of toughness of the material, the addition amount of Si is more preferably not more than 1.5 wt %.

(3) Mn: from 0.20 wt % to 2.00 wt %

Mn is an element which is necessary as a deoxidization element and is necessary for securing the hardenability and hardness. Thus, an addition amount of Mn is 0.20 wt % at minimum. On the other hand, excessive addition of Mn leads to degradation in hot workability. Therefore, the addition amount of Mn is preferably not more than 2.00 wt %.

(4) P: not more than 0.020 wt %

P is an element unavoidably present in a molten material. Increase in P-content results in intergranular embrittlement. Therefore, an addition amount of P is preferably not more than 0.020 wt %, more preferably not more than 0.010 wt %, where deterioration in toughness is substantially prevented.

(5) S: not more than 0.015 wt %

S is unavoidably present in a molten material. As it improves machinability, a method of adding S simultaneously with Mn is widely used. However, when a formation amount of sulfide increases, toughness is remarkably deteriorated. Therefore, an addition amount of S is preferably not more than 0.015 wt %, more preferably not more than 0.010 wt %.

(6) Cu: not more than 1.00 wt %

When Cu is added in a large amount, red shortness is shown and hot workability is lowered. Therefore, an addition amount of Cu is preferably not more than 1.00 wt %, more preferably not more than 0.50 wt %.

(7) Ni: not more than 1.00 wt %

Addition of Ni is available since Ni is effective in improving hardenability and strengthening the matrix. However, excessive addition lowers workability. Therefore, an addition amount of Ni is preferably not more than 1.00 wt %, more preferably not more than 0.50 wt %.

(8) Cr: from 3.50 wt % to 5.00 wt %

Cr dissolves in the matrix at the time of hardening to secure hardenability. An addition amount necessary for securing the hardenability is 3.50 wt % at minimum. In order to secure excellent hardenability, the addition amount of Cr is preferably not less than 4.00 wt %. On the other hand, excessive addition of Cr causes Cr-series carbide to remain or lowers softening resistance at hardening temperatures. Therefore, the addition amount is preferably not more than 5.00 wt %.

When the softening resistance requires improvement, the addition amount or Cr is more preferably not more than 4.50 wt %.

(9) Mo: from 0.00 wt % to 3.00 wt %

Mo forms carbide to strengthen the matrix and improve wear resistance, and secures hardenability. In order to obtain an alloy tool steel excellent in strength, wear resistance and hardenability, an addition amount of Mo is preferably not less than 0.20 wt %. However, when excessively added, Mo remains as carbide at the time of hardening, which leads to deterioration in toughness. Therefore, the addition amount of Mo is preferably not more than 3.00 wt %, more preferably not more than 2.00 wt %.

(10) W: from 0.00 wt % to 10.00 wt %

W forms carbide to strengthen the matrix and improve wear resistance, and secures hardenability. In order to obtain an alloy tool steel excellent in strength, wear resistance and hardenability, an addition amount of W is preferably not less than 1.00 wt %. However, when excessively added, W remains as carbide at the time of hardening, which leads to deterioration in toughness. Therefore, the addition amount of W is preferably not more than 10.00 wt %, more preferably not more than 8.00%.

Incidentally, while W may be solely added, it may also be simultaneously added with Mo because W and Mo bring similar effect. In such an event, addition amounts of W and Mo are preferably determined such that W equivalent (Weq) and an Mo—W ratio (2Mo/Weq) fall within predetermined ranges as described later.

(11) V: from 1.00 wt % to 2.00 wt %

V is an element which combines with C to form stable MC-type carbide. V is effective in preventing coarsening of crystal grains by dispersing as carbide in the matrix at the time of hardening, and improving tempering hardness by dissolving in the matrix at the time of hardening and depositing as fine tempered carbide at the time of tempering. In order to remain in the matrix as the carbide at the time of hardening to prevent the coarsening of the crystal grains, an addition amount of V is preferably not less than 1.00 wt %. On the other hand, in order to suppress deterioration in toughness caused by crystallization of V as coarse carbide, the addition amount of V is preferably not more than 2.00 wt %.

(12) Co: from 0.00 wt % to 8.00 wt %

Co dissolves in the matrix and contributes to improved strength. Further, as Co prevents the coarsening of carbide and contributes to improved softening resistance, it is preferably added actively. While Co is not necessarily added, it might get mixed from scrap to constitute not more than 1.00 wt %. As Co is an expensive addition element, excessive addition will lead to high cost. Also, excessive addition of Co will void the effect of strengthening the matrix and preventing the coarsening of carbide. Therefore, an addition amount of Co is preferably not more than 8.00 wt %, more preferably not more than 5.00 wt %.

(13) Al: not more than 0.10 wt %

Al is unavoidably present in a steel since it is used as a deoxidizer. When excessively added, Al forms oxide to become an inclusion, whereby toughness of the steel is notably lowered. Therefore, an addition amount of Al is preferably not more than 0.10 wt %.

(14) O: not more than 0.01 wt %

O is an element contained in a molten steel and is unavoidably present in the steel. When O is contained in a large amount, it reacts with Al, Si, Mg and the like to generate an oxide-series inclusion. Therefore, O-content is preferably not more than 0.01 wt %.

(15) N: not more than 0.02 wt %

N dissolves in a molten steel during melting, and is unavoidably present. When N is contained in a large amount, it generates nitride to deteriorate a material property. Therefore, N-content is preferably not more than 0.02 wt %.

Hereinafter, the element balances will be described.

(A) Weq: from 2.0 to 10.0

Both Mo and W are elements that form M6C-type carbide. As an atomic weight of W is twice as much as Mo, a formation amount of the M6C-type carbide is represented in terms of Weq (W equivalent) by the following Formula 1, based on a ratio of the atomic weight.

$$\text{Weq}=2\text{Mo}(\text{wt }\%)+\text{W}(\text{wt }\%) \quad \text{Formula 1}$$

When this value is small, a dissolving amount of the carbide at the time of hardening is insufficient, and secondary hardening cannot be attained sufficiently. Therefore, Weq is preferably not less than 2.00, more preferably not less than 4.00. On the other hand, excessive addition of W and/or Mo increases the formation amount of the carbide, whereby it becomes difficult to secure toughness. Therefore, Weq is preferably not more than 10.00 at which the carbide comes to remain remarkably, more preferably not more than 8.00.

(B) 2Mo/Weq: not more than 0.60

2Mo/Weq represents the Mo—W ratio. If this value is small, it means that W is primarily added. The carbide being composed primarily of W is more effective than the carbide being composed primarily of Mo in order to maintain softening resistance as high as possible. Therefore, for improving a ratio of high-temperature strength to room-temperature strength (hereinafter referred to simply as the "strength ratio"), 2Mo/Weq is preferably not more than 0.60. For obtaining a stable strength ratio, 2Mo/Weq is more preferably not more than 0.50. On the other hand, a lower limit of 2Mo/Weq is 0, which represents that only W is added to the steel. In order to obtain high toughness as well as the stable strength ratio, 2Mo/Weq is more preferably not less than 0.1.

(C) ΔC: from −0.3 to 0.0

A ΔC amount is a remaining amount of C in the matrix when all of the respective carbide-forming elements have become carbides, and is represented by the following Formula 2.

$$\Delta C=C(\text{wt }\%)-(0.06\times Cr(\text{wt }\%)+0.063\times Mo(\text{wt }\%)+0.033\times W(\text{wt }\%)+0.2\times V(\text{wt }\%)) \quad \text{Formula 2}$$

Generally, in the high-speed tool steel, the ΔC amount is used as an index of a dissolving amount of C. When this value is large, it means that the dissolving amount of C is large, and the steel is made in such type as to have high hardness but low toughness. On the other hand, when this value is small, the steel is made in such type as to have low hardness but high toughness. As the alloy tool steel consistent with the present invention contains the carbide-forming elements being composed primarily of Cr, Mo, W and V, and among them the addition amount of Cr is somewhat large, the ΔC amount is used as an index of hardness and toughness and an index for calculating a proper C amount.

In other words, if the ΔC amount is excessively small, hardness is difficult to secure. Therefore, the ΔC amount is preferably not less than −0.3. On the other hand, if the ΔC amount is excessively large, toughness is notably deteriorated. Therefore, the ΔC amount is preferably not more than 0.0.

By hardening at a predetermined temperature and tempering at not less than 500° C. with the addition amounts of the respective addition elements defined as above, an alloy tool steel is obtained to have hardness at room temperatures (room-temperature hardness) of not less than 53 HRC, the room-temperature strength of not less than 1800 MPa, and the high-temperature strength at 700° C. of not less than 450 MPa. Further, when the composition is optimized, an alloy tool steel with the room-temperature strength of not less than 1900 MPa and the high-temperature strength at 700° C. of not less than 600 MPa may be obtained.

Then, in addition to the respective elements mentioned above, the alloy tool steel consistent with the present invention may further contain one or more kinds of the following elements.

(16) Nb: not more than 0.50 wt %

Similarly to V, Nb is an element which combines with C to form stable MC carbide. The carbide composed primarily of Nb shows higher stability than that composed primarily of V, and it hardly dissolves in the matrix at the time of hardening. Therefore, it may be added as needed as it is effective in preventing the coarsening of the crystal grains at the time of hardening. However, excessive addition of Nb generates coarse carbide to lower toughness. Thus, an addition amount of Nb is preferably not more than 0.50 wt %.

(17) Ti: not more than 0.10 wt %

Ti is an element which combines with C and N and contributes to improved high-temperature strength and refining of the crystal grains, and may be added as needed. However, excessive addition of Ti causes a large amount of oxide and nitride to remain in the steel. The remaining oxide and nitride deteriorate workability. Therefore, an addition amount of Ti is preferably not more than 0.10 wt %.

(18) B: not more than 0.01 wt %

B is an element which strengthens a crystal grain boundary and contributes to an improved impact value and secured hot toughness, and may be added as needed. However, when B is excessively added, a concentration area of B is formed in the vicinity of the grain boundary and a molten phase appears at not more than 1200° C. to lower hot workability. Therefore, an addition amount of B is preferably not more than 0.01 wt %.

Among the above-mentioned compositions, the alloy tool steel consistent with the present invention with such a composition is specifically preferable that the contents of C, Si, Cr, Mo, W and Co, Weq and 2Mo/Weq are within the ranges as provided below:

C: from 0.50 wt % to 0.60 wt %;
Si: from 0.10 wt % to 0.50 wt %;
Cr: from 4.00 wt % to 4.50 wt %;
Mo: from 0.20 wt % to 2.00 wt %;
W: from 1.00 wt % to 8.00 wt %;
Co: not more than 5.00 wt %;
Weq: from 4.0 to 8.0; and
2Mo/Weq: from 0.10 to 0.50.

By hardening and tempering under predetermined conditions with the addition amounts of the respective addition elements within the above-mentioned ranges, an alloy tool steel may be obtained to have the ratio of strength at a high temperature (700° C.) to that at room temperature (25° C.) (i.e., the strength ratio) of not less than 0.25.

Moreover, in addition to the respective elements as mentioned above, the alloy tool steel consistent with the present invention may further contain one or more kinds of elements as provided below.

(19) Ta and/or Zr: not more than 0.10 wt %

Both Ta and Zr are very strong nitride-forming and carbide-forming elements. This type of carbonitride acts to make the crystal grains fine. However, when Ta and/or Zr are excessively added, massive carbonitride is formed, whereby deteriorating toughness. Therefore, addition amounts of Ta and/or Zr are preferably not more than 0.10 wt % in total (Ta+Zr).

(20) Ca, Te and/or Se: not more than 0.10 wt %

Ca, Te and Se are used with S and Mn for formation control of MnS. They are unavoidably mixed from the outside and form stable oxide and sulfide, whereby deteriorating ductility. Therefore, addition amounts of Ca, Te and/or Se are preferably not more than 0.10 wt % in total (Ca+Te+Se).

(21) Pb and/or Bi: not more than 0.10 wt %

Both Pb and Bi are low-melting metals existing in the steel as an inclusion. As they melt at low temperatures, they lower hot workability of the steel. Therefore, addition amounts of Pb and/or Bi are preferably not more than 0.10 wt % in total (Pb+Bi).

(22) Mg: not more than 0.01 wt %

Mg is a strong oxide-forming element which reacts with oxygen in the steel to form oxide. Thus, Mg remains as an oxide-series inclusion to possibly lower quality. Therefore, an addition amount of Mg is preferably not more than 0.01 wt %.

(23) REM: not more than 0.010 wt %

REM primarily consists of La, Ce and Pr. As REM has a strong nitride-forming ability, if it is added to the steel, nitrogen fixation is performed in the beginning of solidification to delay formation of the nitride consisting of Nb, V and the like. In addition, the MC carbide in a solidified structure is thereby refined to contribute to making the structure uniform. However, excessive addition of REM leads to formation of a large amount of oxide, which causes generation of an inclusion. Therefore, an addition amount of REM is preferably not more than 0.010 wt %.

Further, as for the alloy tool steel consistent with the present invention, in the event that Ta and/or Zr, Ca, Te and/or Se, Pb and/or Bi, Mg, and/or REM are added in the amounts within the above ranges, the addition amounts of P, S, Cu and Ni among the elements contained in the steel are preferably within the following ranges:

P: not more than 0.010 wt %;

S: not more than 0.010 wt %;

Cu: not more than 0.50 wt %; and

Ni: not more than 0.50 wt %.

By hardening and tempering under predetermined conditions with the addition amounts of the respective elements being within the above-mentioned ranges, an alloy tool steel may be obtained to have the ratio of strength at a high temperature (700° C.) to that at room temperature (25° C.) (i.e., the strength ratio) of not less than 0.30.

As provided above, in the alloy tool steel consistent with the present invention, the composition of the above-mentioned respective elements is optimized to attain the strength ratio of not less than 0.25, or not less than 0.30.

Further, by optimizing the composition, the alloy tool steel having the high-temperature strength at 700° C. of not less than 600 MPa, not less than 650 MPa, or not less than 700 MPa may be obtained.

Furthermore, by optimizing the composition, the alloy tool steel having the room-temperature hardness of not less than 55 HRC, the room-temperature strength of not less than 1900 MPa, and the strength ratio of not less than 0.27 may be obtained.

Still further, by further optimizing the composition, the alloy tool steel having the room-temperature hardness of not less than 55 HRC, the room-temperature strength of not less than 2000 MPa, and the strength ratio of not less than 0.29 may be obtained.

Still further, by further optimizing the composition, the alloy tool steel having the room-temperature hardness of not less than 55 HRC, the room-temperature strength of not less than 2100 MPa, and the strength ratio of not less than 0.30 may be obtained.

Still further, by further optimizing the composition, the alloy tool steel having the room-temperature hardness of not less than 55 HRC, the room-temperature strength of not less than 2200 MPa, and the strength ratio of not less than 0.31 may be obtained.

While the alloy tool steel consistent with the present invention may be used after the hardening and tempering as it is, surface treatment may be provided to the hardened and tempered alloy tool steel. A method of surface treatment is not specifically limited and various methods may be adopted. Specifically, carbonizing treatment, nitriding treatment, carbonizing and nitrizing treatment, CVD treatment, PVD treatment, TD treatment and the like are mentioned as suitable examples for the method of surface treatment.

The alloy tool steel consistent with the present invention is subjected to heat treatment before use, according to a process similar to that applied to usual alloy tool steels. Specifically, a material with a predetermined composition is melted and cast, and then forged at a predetermined forging ratio. Then, the resultant material is hardened and tempered at predetermined temperatures. As for the forging ratio, the hardening temperature, the tempering temperature and the like, the optimum conditions may be selected in accordance with a composition, an application purpose, a property required, and the like of the alloy tool steel.

Next, effects of the alloy tool steel consistent with the present invention will be described. As the composition of the respective addition elements is optimized, and the ranges of Weq, 2Mo/Weq and ΔC are optimized, the alloy tool steel may suppress lowering of high-temperature strength while maintaining high room-temperature strength.

Weq indicates an amount of secondary precipitation of the carbide which precipitates during tempering. ΔC indicates the index of the dissolving amount of C. Therefore, as Weq and/or ΔC increase, the amount of secondary precipitation tends to increase. On the other hand, the value of the W—Mo ratio (2Mo/Weq) influences the kind of the carbide to be precipitated during the tempering and the condition of precipitation, and it indicates that, as 2Mo/Weq becomes large, the carbide being primarily composed of Mo precipitates.

Also, as the lowering of the high-temperature strength is caused by the cohesion and coarsening of the carbide precipitated during the tempering, if the cohesion and coarsening are precluded, it becomes possible to maintain the high-temperature strength. Besides, the cohesion and coarsening of carbide are caused by diffusion of Mo, W and the like, and a diffusion speed of W is slower than Mo. Accordingly, when Mo, of which the diffusion speed is faster, is substituted by W, of which the diffusion speed is slower, the cohesion and coarsening of carbide are precluded, so that it becomes possible to maintain the high-temperature strength.

Specifically, the strength ratio is improved by optimizing the addition amounts of the respective elements, the values Weq and ΔC and adding W so that 2Mo/Weq shows 0.6 or less. In addition, when 2Mo/Weq is made not more than 0.5, the strength ratio with further stability is obtained.

EXAMPLE

Table 1 shows elements in the alloy tool steels consistent with the present invention (inventive steels 1, 2-1 to 2-3, and 3 to 16). Further, Table 2 shows elements as comparative examples in the conventional matrix high-speed tool steels (1 to 6) and the conventional hot die steels (1, 2, SKD61, SKD7, SKD4, SKD5, SKD8, DH42, 2-4, and 2-5).

TABLE 1

| Inventive steel | C | Si | Mn | P | S | Cu | Ni | Cr | Mo | W | V | Co | Nb | Al | Ti | B |
|---|---|---|---|---|---|---|---|---|---|---|---|---|---|---|---|---|
| 1 | 0.48 | 0.15 | 0.37 | 0.009 | 0.011 | 0.43 | 0.84 | 4.53 | 2.33 | 3.45 | 1.19 | 4.25 | 0.02 | 0.008 | | |
| 2-1 | 0.54 | 0.31 | 0.48 | 0.004 | 0.008 | 0.24 | 0.14 | 4.31 | 0.51 | 4.02 | 1.48 | 2.03 | | 0.040 | | |
| 2-2 | 0.53 | 0.29 | 0.52 | 0.006 | 0.005 | 0.34 | 0.25 | 4.27 | 1.02 | 2.89 | 1.53 | 1.98 | | 0.003 | | |
| 2-3 | 0.55 | 0.33 | 0.53 | 0.002 | 0.007 | 0.15 | 0.37 | 4.23 | 1.48 | 2.11 | 1.46 | 1.94 | | 0.014 | | |
| 3 | 0.48 | 0.49 | 0.47 | 0.004 | 0.014 | 0.42 | 0.19 | 4.33 | 0.48 | 4.11 | 1.63 | 4.02 | | 0.036 | | |
| 4 | 0.52 | 0.44 | 0.49 | 0.003 | 0.012 | 0.13 | 0.04 | 4.33 | 0.48 | 4.25 | 1.85 | 4.02 | 0.12 | 0.063 | 0.01 | |
| 5 | 0.58 | 0.88 | 0.31 | 0.014 | 0.009 | 0.56 | 0.43 | 3.59 | 0.89 | 5.34 | 1.22 | 1.02 | | 0.021 | | |
| 6 | 0.63 | 0.76 | 0.67 | 0.009 | 0.004 | 0.37 | 0.56 | 4.89 | 1.34 | 3.89 | 1.89 | 3.45 | 0.11 | 0.011 | | |
| 7 | 0.52 | 0.48 | 0.99 | 0.004 | 0.007 | 0.21 | 0.66 | 4.66 | 1.89 | 3.33 | 1.01 | 6.22 | 0.05 | 0.003 | | |
| 8 | 0.64 | 0.49 | 0.45 | 0.018 | 0.014 | 0.86 | 0.45 | 4.13 | 2.75 | 4.11 | 1.89 | 2.57 | | 0.007 | | 0.003 |
| 9 | 0.57 | 0.14 | 0.64 | 0.019 | 0.002 | 0.13 | 0.31 | 3.89 | 1.89 | 4.48 | 1.78 | 3.12 | | 0.013 | | |
| 10 | 0.49 | 0.95 | 0.29 | 0.004 | 0.007 | 0.22 | 0.84 | 3.63 | 0.54 | 3.45 | 1.22 | 0.56 | | 0.024 | 0.04 | |
| 11 | 0.63 | 0.27 | 0.59 | 0.017 | 0.009 | 0.11 | 0.14 | 4.93 | 2.65 | 3.64 | 1.03 | 1.36 | 0.21 | 0.037 | | |
| 12 | 0.59 | 0.64 | 0.87 | 0.019 | 0.005 | 0.35 | 0.25 | 4.22 | 2.33 | 4.35 | 1.68 | 2.11 | | 0.041 | | |
| 13 | 0.63 | 0.41 | 0.34 | 0.007 | 0.004 | 0.43 | 0.04 | 4.89 | 1.56 | 6.21 | 1.63 | 0.89 | | 0.004 | | 0.002 |
| 14 | 0.58 | 0.12 | 0.49 | 0.012 | 0.008 | 0.24 | 0.43 | 4.21 | 1.33 | 5.33 | 1.24 | 4.21 | | 0.030 | | |
| 15 | 0.54 | 0.19 | 0.62 | 0.015 | 0.003 | 0.64 | 0.56 | 3.68 | 0.31 | 3.34 | 1.38 | 1.78 | | 0.004 | | 0.008 |
| 16 | 0.63 | 0.34 | 0.33 | 0.002 | 0.013 | 0.14 | 0.06 | 4.15 | 2.33 | 3.89 | 1.21 | 3.45 | | 0.042 | | |

| Inventive steel | O | N | Ta, Zr | Se, Te, Ca, Pb, Bi | Mg, REM |
|---|---|---|---|---|---|
| 1 | 0.0021 | 0.019 | | | |
| 2-1 | 0.0031 | 0.013 | | | |
| 2-2 | 0.0014 | 0.012 | | | |
| 2-3 | 0.0012 | 0.015 | | | |
| 3 | 0.0047 | 0.019 | | | |
| 4 | 0.0067 | 0.002 | | Ca: 0.001 | |
| 5 | 0.0010 | 0.007 | Ta: 0.04 | | Mg: 0.01 |
| 6 | 0.0030 | 0.006 | Zr: 0.01 | | |
| 7 | 0.0024 | 0.013 | | Ca: 0.002, Se: 0.01 | |
| 8 | 0.0031 | 0.019 | | | |
| 9 | 0.0049 | 0.008 | | | |
| 10 | 0.0086 | 0.014 | Zr: 0.02 | | |
| 11 | 0.0012 | 0.012 | | | |
| 12 | 0.0035 | 0.004 | | Te: 0.03 | |
| 13 | 0.0045 | 0.009 | | Pb: 0.01, Bi: 0.05 | REM: 0.001 |
| 14 | 0.0014 | 0.018 | Ta: 0.04 | | |
| 15 | 0.0063 | 0.017 | | | |
| 16 | 0.0045 | 0.008 | Ta: 0.02, Zr: 0.02 | | |

TABLE 2

| Comparative steel | Steel | C | Si | Mn | P | S | Cu | Ni | Cr | Mo | W | V | Co | Nb | Al |
|---|---|---|---|---|---|---|---|---|---|---|---|---|---|---|---|
| Matrix high-speed tool steel | 1 | 0.52 | 0.11 | 0.40 | 0.002 | 0.001 | 0.02 | 0.02 | 4.22 | 2.00 | 1.55 | 1.19 | 0.99 | 0.09 | |
| | 2 | 0.65 | 1.46 | 0.40 | 0.002 | 0.001 | 0.02 | 0.02 | 4.23 | 2.80 | <.01 | 1.80 | <.01 | <.01 | |
| | 3 | 0.80 | 0.85 | 0.30 | 0.002 | 0.001 | 0.02 | 0.01 | 4.99 | 5.45 | 1.19 | 1.19 | <.01 | <.01 | |
| | 4 | 0.55 | 0.07 | 0.30 | 0.001 | 0.001 | 0.02 | 0.01 | 4.52 | 3.74 | 1.49 | 0.99 | <.01 | <.01 | |
| | 5 | 0.81 | 0.80 | 0.30 | 0.004 | 0.002 | 0.02 | 0.01 | 5.47 | 4.50 | 1.01 | 1.20 | <.01 | <.01 | |
| | 6 | 0.56 | 0.07 | 0.30 | 0.006 | 0.001 | 0.02 | 0.01 | 5.57 | 3.75 | 1.51 | 1.00 | <.01 | <.01 | |
| Hot die steel | 1 | 0.35 | 0.25 | 0.60 | <.001 | 0.001 | 0.02 | 0.01 | 5.53 | 3.12 | <.01 | 0.79 | <.01 | <.01 | 0.008 |
| | 2 | 0.48 | 0.25 | 0.60 | 0.001 | 0.001 | 0.02 | 0.01 | 5.51 | 2.99 | 0.01 | 0.80 | <.01 | <.01 | |
| | SKD61 | 0.39 | 0.35 | 0.40 | 0.001 | | | | 5.17 | 1.20 | 0.04 | 0.85 | 0.13 | | |
| | SKD7 | 0.36 | 0.77 | 0.32 | 0.008 | | | | 2.97 | 3.00 | | 0.55 | 0.22 | | |
| | SKD4 | 0.30 | 0.30 | 0.50 | | | | | 2.50 | | 5.50 | 0.40 | | | |
| | SKD5 | 0.30 | 0.30 | 0.50 | | | | | 2.50 | | 8.00 | 0.40 | | | |
| | SKD8 | 0.30 | 0.40 | 0.50 | | | | | 4.20 | 0.40 | 4.00 | 2.00 | 4.00 | | |
| | DH42 | 0.41 | 0.30 | 0.30 | | | | | 3.50 | 1.50 | 2.10 | 1.00 | 2.00 | | |
| | 2-4 | 0.56 | 0.27 | 0.54 | 0.008 | 0.004 | 0.22 | 0.14 | 4.32 | 2.01 | 1.02 | 1.49 | 2.12 | | 0.033 |
| | 2-5 | 0.53 | 0.27 | 0.47 | 0.004 | 0.008 | 0.11 | 0.32 | 4.26 | 2.49 | 0.05 | 1.55 | 2.09 | | 0.014 |

| Comparative steel | Steel | Ti | B | O | N | Ta, Zr | Se, Te, Ca, Pb, Bi | Mg, REM |
|---|---|---|---|---|---|---|---|---|
| Matrix high-speed | 1 | <.01 | | 0.0021 | 0.0051 | — | — | — |
| | 2 | <.01 | | 0.0016 | 0.0076 | — | — | — |

TABLE 2-continued

| | | | | | | | | |
|---|---|---|---|---|---|---|---|---|
| tool steel | 3 | <.01 | | 0.0020 | 0.0051 | — | — | — |
| | 4 | <.01 | | 0.0016 | 0.0041 | — | — | — |
| | 5 | <.01 | | 0.0020 | 0.0045 | — | — | — |
| | 6 | <.01 | | 0.0012 | 0.0037 | — | — | — |
| Hot die | 1 | <.01 | <.002 | 0.0020 | 0.0047 | — | — | — |
| steel | 2 | <.01 | | 0.0009 | 0.0032 | — | — | — |
| | SKD61 | | | 0.0030 | | — | — | — |
| | SKD7 | | | 0.0028 | | — | — | — |
| | SKD4 | | | | | | | |
| | SKD5 | | | | | | | |
| | SKD8 | | | | | | | |
| | DH42 | | | | | | | |
| | 2-4 | | | 0.0024 | 0.009 | | | |
| | 2-5 | | | 0.0025 | 0.014 | | | |

Each of the inventive steels shown in Table 1 and the matrix high-speed tool steels and the hot die steels (hereinafter referred to as the "comparative steels") shown in Table 2 was melted and cast in a vacuum induction furnace of 150 kg, and then subjected to soaking treatment (1230° C.×10 hr or longer). Next, the resultant ingot was forged at a forging ratio of 8 S. Further, hardening and tempering was performed at temperatures optimum for each of the steels.

Besides, the hardening was performed as follows. The resultant material was kept at medium temperatures (800° C. to 850° C.) for 10 minutes, kept at a hardening temperature for a predetermined time, and was oil-cooled. The keeping time at the hardening temperature was 30 minutes when the hardening temperature was less than 1100° C., and 5 minutes when the hardening temperature was not less than 1100° C. The tempering was performed by repeating twice the procedure of keeping a predetermined temperature for 1 hour and air-cooling.

Characteristic test was performed on each of the obtained inventive steels and comparative steels. The characteristic test was performed for hardness and tensile strength at room temperature (25° C.), and tensile strength at a high temperature (700° C.) after the hardening and tempering. In addition, the strength ratio was calculated from the tensile strength at room temperature and the tensile strength at a high temperature. Table 3 shows the results on the inventive steels and Table 4 shows the results on the comparative steels.

TABLE 3

| Inventive steel | Δ C | Weq. | 2Mo/Weq. | Hardening temperature (° C.) | Tempering temperature (° C.) | Hardness HRC | Room-temperature strength (MPa) | High-temperature strength (MPa) | Strength ratio |
|---|---|---|---|---|---|---|---|---|---|
| 1 | −0.29 | 8.11 | 0.57 | 1100 | 560 | 59 | 2373 | 691 | 0.291 |
| 2-1 | −0.18 | 5.04 | 0.20 | 1130 | 600 | 58 | 2297 | 725 | 0.316 |
| 2-2 | −0.19 | 4.93 | 0.41 | 1150 | 600 | 58.5 | 2335 | 711 | 0.305 |
| 2-3 | −0.16 | 5.07 | 0.58 | 1150 | 600 | 58 | 2297 | 673 | 0.293 |
| 3 | −0.27 | 5.07 | 0.19 | 1150 | 560 | 53 | 1944 | 646 | 0.332 |
| 4 | −0.29 | 5.21 | 0.18 | 1150 | 560 | 56 | 2150 | 711 | 0.331 |
| 5 | −0.11 | 7.12 | 0.25 | 1150 | 600 | 57 | 2222 | 689 | 0.310 |
| 6 | −0.27 | 6.57 | 0.41 | 1100 | 540 | 59 | 2373 | 722 | 0.304 |
| 7 | −0.20 | 7.11 | 0.53 | 1150 | 540 | 60 | 2452 | 742 | 0.303 |
| 8 | −0.29 | 9.61 | 0.57 | 1130 | 600 | 58 | 2297 | 654 | 0.285 |
| 9 | −0.29 | 8.26 | 0.46 | 1130 | 600 | 57 | 2222 | 664 | 0.299 |
| 10 | −0.12 | 4.53 | 0.24 | 1100 | 580 | 58 | 2297 | 710 | 0.309 |
| 11 | −0.18 | 8.94 | 0.59 | 1100 | 580 | 56 | 2150 | 634 | 0.295 |
| 12 | −0.29 | 9.01 | 0.52 | 1130 | 600 | 55.5 | 2114 | 611 | 0.289 |
| 13 | −0.29 | 9.33 | 0.33 | 1150 | 600 | 55 | 2079 | 627 | 0.301 |
| 14 | −0.18 | 7.99 | 0.33 | 1130 | 600 | 56.8 | 2208 | 698 | 0.316 |
| 15 | −0.09 | 3.96 | 0.16 | 1100 | 620 | 55 | 2079 | 673 | 0.324 |
| 16 | −0.14 | 8.55 | 0.55 | 1130 | 600 | 58 | 2297 | 669 | 0.291 |

TABLE 4

| Comparative steel | Steel | Δ C | Weq. | 2Mo/Weq. | Hardening temperature (° C.) | Tempering temperature (° C.) | Hardness HRC | Room-temperature strength (MPa) | High-temperature strength (MPa) | Strength ratio |
|---|---|---|---|---|---|---|---|---|---|---|
| Matrix high-speed tool steel | 1 | −0.16 | 5.55 | 0.72 | 1150 | 580 | 58.3 | 2320 | 610 | 0.263 |
| | 2 | −0.14 | 5.60 | 1.00 | 1150 | 560 | 62.5 | 2656 | 612 | 0.231 |
| | 3 | −0.12 | 12.09 | 0.90 | 1140 | 580 | 65.5 | 2918 | 702 | 0.240 |
| | 4 | −0.20 | 8.97 | 0.83 | 1150 | 580 | 62 | 2614 | 646 | 0.247 |
| | 5 | −0.08 | 10.01 | 0.90 | 1140 | 560 | 67 | 3055 | 735 | 0.241 |
| | 6 | −0.26 | 9.01 | 0.83 | 1130 | 560 | 63 | 2698 | 667 | 0.247 |
| Hot die steel | 1 | −0.34 | 6.24 | 1.00 | 1040 | 640 | 48 | 1641 | 378 | 0.231 |
| | 2 | −0.20 | 5.99 | 1.00 | 1030 | 620 | 50 | 1756 | 405 | 0.231 |
| | SKD61 | −0.17 | 2.44 | 0.98 | 1030 | 620 | 48 | 1641 | 382 | 0.233 |

TABLE 4-continued

| Comparative steel | Steel | ΔC | Weq. | 2Mo/Weq. | Hardening temperature (° C.) | Tempering temperature (° C.) | Hardness H R C | Room-temperature strength (MPa) | High-temperature strength (MPa) | Strength ratio |
|---|---|---|---|---|---|---|---|---|---|---|
| | SKD7 | −0.12 | 6.00 | 1.00 | 1030 | 620 | 48.6 | 1674 | 388 | 0.232 |
| | SKD4 | −0.11 | 5.50 | 0.00 | 1080 | 600 | 51 | 1817 | 601 | 0.331 |
| | SKD5 | −0.19 | 8.00 | 0.00 | 1100 | 580 | 47 | 1586 | 524 | 0.331 |
| | SKD8 | −0.51 | 4.80 | 0.17 | 1130 | 540 | 52 | 1880 | 630 | 0.335 |
| | DH42 | −0.16 | 5.10 | 0.59 | 1050 | 600 | 47 | 1586 | 451 | 0.284 |
| | 2-4 | −0.16 | 5.04 | 0.80 | 1150 | 600 | 57 | 2222 | 579 | 0.260 |
| | 2-5 | −0.19 | 5.03 | 0.99 | 1130 | 600 | 56.5 | 2186 | 554 | 0.253 |

Among the hot die steels in the comparative steels, each of SKD4, SKD5 and SKD8 showed the strength ratio exceeding 3.0. However, the room-temperature hardness was not more than 52 HRC and the room-temperature strength was less than 1900 MPa.

On the other hand, among the hot die steels in the comparative steels, steels 2-4 and 2-5 showed the room-temperature hardness exceeding 55 HRC and the room-temperature strength of exceeding 2000 MPa. Further, any of the matrix high-speed tool steels had high room-temperature hardness and high room-temperature strength, and the values exceeded the steels 2-4 and 2-5. However, each of those comparative steels showed the strength ratio of from 0.231 to 0.263, and the high-temperature strength was greatly lowered.

To the contrary, in each of the inventive steels, the room-temperature hardness was not less than 53 HRC. Also, the room-temperature strength was not less than 1900 MPa. Further, the strength ratio was not less than 2.80. High values were stably obtained. It is revealed from Table 3 that the alloy tool steels consistent with the present invention has high strength both at room temperatures and high temperatures; therefore, it is useful as a material for dies used at high temperatures.

FIG. 1 shows a relationship between the room-temperature strength and the high-temperature strength at 700° C. in respect of each of the steels shown in Tables 1 and 2. FIG. 1 indicates that the alloy tool steel consistent with the present invention (inventive steels) has higher room-temperature strength (i.e., not less than 1900 MPa) and higher strength ratio (i.e., not less than 0.27) than the comparative steels.

Figure 2:
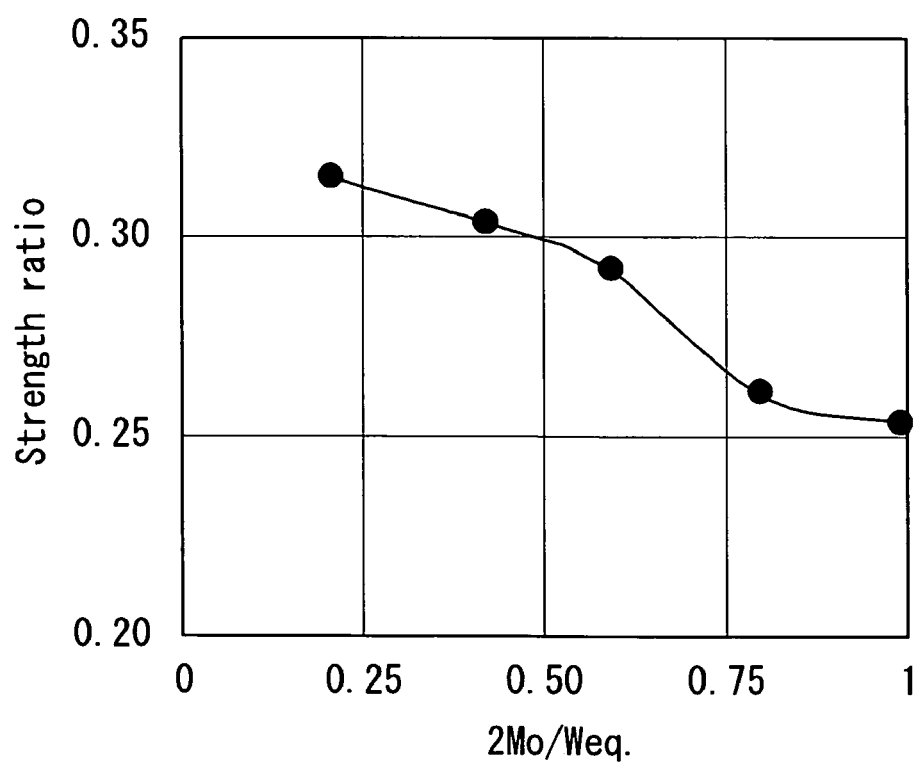
FIG. 2 is a graph showing a relationship between 2Mo/Weq and a ratio of high-temperature strength to room-temperature strength.

FIG. 2 shows a relationship between 2Mo/Weq and the strength ratio in respect of the inventive steels (steels 2-1 to 2-3) and the comparative steels (steels 2-4 and 2-5). FIG. 2 indicates that, as 2Mo/Weq becomes smaller, the strength ratio becomes higher. It is considered that this is because the cohesion and coarsening of carbide were suppressed by increasing a ratio of W.

The alloy tool steel consistent with the present invention may be applied as a material for various tools including the hot/warm plastic working dies.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An alloy tool steel comprising:
   from 0.50 wt % to 0.60 wt % C;
   from 0.10 wt % to 1.00 wt % Si;
   from 0.20 wt % to 2.00 wt % Mn;
   not more than 0.020 wt % P;
   not more than 0.015 wt % S;
   not more than 1.00 wt % Cu;
   not more than 1.00 wt % Ni;
   from 3.50 wt % to 5.00 wt % Cr;
   from 0.00 wt % to 3.00 wt % Mo;
   from 0.00 wt % to 10.00 wt % W;
   from 1.00 wt % to 2.00 wt % V; from 0.00 wt % to 8.00 wt % Co;
   not more than 0.10 wt % Al;
   not more than 0.01 wt % O;
   not more than 0.02 wt % N; and
   the balance substantially consisting of Fe and unavoidable impurities,
   wherein Weq is from 2.0 to 10.0,
   2Mo/Weq is not more than 0.50, and
   ΔC is from −0.3 to 0.0,
   where Weq=2Mo(wt %)+W(wt %), and ΔC=C(wt %)−(0.06×Cr(wt %)+0.063×Mo (wt %)+0.033×W(wt %)+0.2×V(wt %)); and wherein room-temperature hardness is not less than 55 HRC, room-temperature strength is not less than 1900 MPa, and a ratio of high-temperature strength at 700° C. to room-temperature strength is not less than 0.30.

2. The alloy tool steel according to claim 1, further comprising at least one element selected from the group consisting of:
   not more than 0.50 wt % Nb;
   not more than 0.10 wt % Ti; and
   not more than 0.01 wt % B.

3. The alloy tool steel according to claim 2, wherein the steel comprises:
   from 0.50 wt % to 0.60 wt % C;
   from 0.10 wt % to 0.50 wt % Si;
   from 4.00 wt % to 4.50 wt % Cr;
   from 0.20 wt % to 2.00 wt % Mo;
   from 1.00 wt % to 8.00 wt % W; and
   from 0.00 wt % to 5.00 wt % Co,
   Weq is 4.0 to 8.0, and
   2Mo/Weq is 0.10 to 0.50.

4. The alloy tool steel according to claim 3, wherein the steel comprises:
   not more than 0.010 wt % P;
   not more than 0.010 wt % S;
   not more than 0.50 wt % Cu; and not more than 0.50 wt % Ni, and the steel further comprises at least one element selected from the group consisting of:

not more than 0.10 wt % (Ta+Zr);

not more than 0.10 wt % (Ca+Te+Se);

not more than 0.10 wt % (Pb+Bi);

not more than 0.01 wt % Mg; and not more than 0.010 wt % REM.

5. The alloy tool steel according to claim 2, wherein the steel comprises:

not more than 0.010 wt % P;

not more than 0.010 wt % S;

not more than 0.50 wt % Cu; and not more than 0.50 wt % Ni, and the steel further comprises at least one element selected from the group consisting of:

not more than 0.10 wt % (Ta+Zr);

not more than 0.10 wt % (Ca+Te+Se);

not more than 0.10 wt % (Pb+Bi);

not more than 0.01 wt % Mg; and not more than 0.010 wt % REM.

6. The alloy tool steel according to claim 1, wherein the steel comprises:

from 0.50 wt % to 0.60 wt % C;

from 0.10 wt % to 0.50 wt % Si;

from 4.00 wt % to 4.50 wt % Cr;

from 0.20 wt % to 2.00 wt % Mo;

from 1.00 wt % to 8.00 wt % W; and from 0.00 wt % to 5.00 wt % Co,

Weq is 4.0 to 8.0, and

2Mo/Weq is 0.10 to 0.50.

7. The alloy tool steel according to claim 6, wherein the steel comprises:

not more than 0.010 wt % P;

not more than 0.010 wt % S;

not more than 0.50 wt % Cu; and not more than 0.50 wt % Ni, and the steel further comprises at least one element selected from the group consisting of:

not more than 0.10 wt % (Ta+Zr);

not more than 0.10 wt % (Ca+Te+Se);

not more than 0.10 wt % (Pb+Bi);

not more than 0.01 wt % Mg; and not more than 0.01 wt % REM.

8. The alloy tool steel according to claim 1, wherein the steel comprises:

not more than 0.010 wt % P;

not more than 0.010 wt % S;

not more than 0.50 wt % Cu; and not more than 0.50 wt % Ni, and the steel further comprises at least one element selected from the group consisting of:

not more than 0.10 wt % (Ta+Zr);

not more than 0.10 wt % (Ca+Te+Se);

not more than 0.10 wt % (Pb+Bi);

not more than 0.01 wt % Mg; and not more than 0.010 wt % REM.

* * * * *